(12) United States Patent
Santucci et al.

(10) Patent No.: US 10,730,574 B2
(45) Date of Patent: Aug. 4, 2020

(54) MOTORCYCLE INCLUDING AN AUXILIARY LIGHTING DEVICE FOR PARKING OPERATIONS

(71) Applicant: PIAGGIO & C. S.P.A., Pontedera, (Pisa) (IT)

(72) Inventors: Mario Donato Santucci, Pontedera (IT); Stefano Bartolozzi, Pontedera (IT)

(73) Assignee: PIAGGIO & C. S.P.A., Pontedera (Pisa) (IT)

( * ) Notice: Subject to any disclaimer, the term of this patent is extended or adjusted under 35 U.S.C. 154(b) by 0 days.

(21) Appl. No.: 16/312,954

(22) PCT Filed: Jun. 9, 2017

(86) PCT No.: PCT/IB2017/053415
§ 371 (c)(1),
(2) Date: Dec. 21, 2018

(87) PCT Pub. No.: WO2018/002749
PCT Pub. Date: Jan. 4, 2018

(65) Prior Publication Data
US 2019/0359276 A1 Nov. 28, 2019

(30) Foreign Application Priority Data
Jun. 28, 2016 (IT) .................. 102016000067012

(51) Int. Cl.
*B62J 6/02* (2020.01)
*B60Q 1/48* (2006.01)
(Continued)

(52) U.S. Cl.
CPC .................. *B62J 6/02* (2013.01); *B60Q 1/18* (2013.01); *B60Q 1/48* (2013.01); *F21S 41/10* (2018.01)

(58) Field of Classification Search
CPC ...... B62J 6/02; B60Q 1/18; B60Q 1/48; F21S 41/10
See application file for complete search history.

(56) References Cited

U.S. PATENT DOCUMENTS

2007/0223240 A1 9/2007 Brown
2010/0123402 A1* 5/2010 Chen .................... B60Q 1/1423
315/156

FOREIGN PATENT DOCUMENTS

EP 2130713 A1 12/2009
EP 2669161 A1 12/2013
JP 2014118135 A 6/2014

OTHER PUBLICATIONS

International Search Report for corresponding application PCT/IB2017/053415 filed on Jun. 9, 2017; dated Aug. 29, 2017.
(Continued)

*Primary Examiner* — Thomas M Sember
(74) *Attorney, Agent, or Firm* — Cantor Colburn LLP

(57) ABSTRACT

A motorcycle (1) including:—a motorcycle body (2,3,4) extending along a longitudinal axis (L-L) and having a front part (2), a tail part (4) and a central part (3) included between the front part (2) and the tail part (4);—at least two wheels (5,6) constrained to the motorcycle body (2,3,4), including a front wheel (5) and a rear wheel (6);—a traction engine (7) constrained to the motorcycle body (2, 3, 4) and operatively connected to at least one of the wheels (5, 6);—at least one headlight (12) fixed to the front part (2) and at least one rear light (14) fixed to the tail part (4);—at least one kickstand (100) adapted to be moved in order to selectively assume a resting operating position and a working operating position, wherein, in the working operating position, the kickstand has at least one end portion leaning against a ground portion (Continued)

being placed laterally and/or under the motorcycle body;—
one first auxiliary lighting device (50) adapted to light the kickstand (10).

14 Claims, 3 Drawing Sheets

(51) Int. Cl.
    *F21S 41/10*     (2018.01)
    *B60Q 1/18*     (2006.01)

(56) References Cited

OTHER PUBLICATIONS

Written Opinion of the International Searching Authority for corresponding application PCT/IB2017/053415 filed on Jun. 28, 2017; dated Aug. 29, 2017.

\* cited by examiner

MOTORCYCLE INCLUDING AN AUXILIARY LIGHTING DEVICE FOR PARKING OPERATIONS

The present description relates to the technical field of motorcycles and in particular it relates to a motorcycle including an auxiliary lighting device for parking operations.

Lighting systems on board motorcycles allowing to safely use the motorcycles thereof have been used for a long time. Motorcycles are in fact provided with a headlight, a rear light, direction indicators, etc. The headlight allows to light a ground area arranged at the front of the motorcycle and to make the motorcycle visible to people placed in front of the motorcycle. The rear light allows to make the motorcycle visible to people placed behind it and to signal that the brakes of the motorcycle are activated.

However, the prior art lighting systems do not allow the motorcycle driver to carry out the parking operations safely enough under environmental low lighting conditions, as the driver may injury himself when activating the kickstand, for example he may come in contact with hot pieces of the motorcycle or he may lose his balance.

One general object of the present description is to provide a motorcycle having an auxiliary lighting device for parking operations allowing to overcome or reduce, at least partially, the drawbacks of the prior art motorcycles.

This and other objects are obtained through a motorcycle as defined in claim 1 in its more general form, and in the claims depending from it in some of its peculiar embodiments.

The invention shall be better understood from the following detailed description of embodiments, for exemplary purposes and not limited to the enclosed drawings, wherein.

In the enclosed figures, same or similar elements will be indicated by the same reference numbers.

Figure 1:
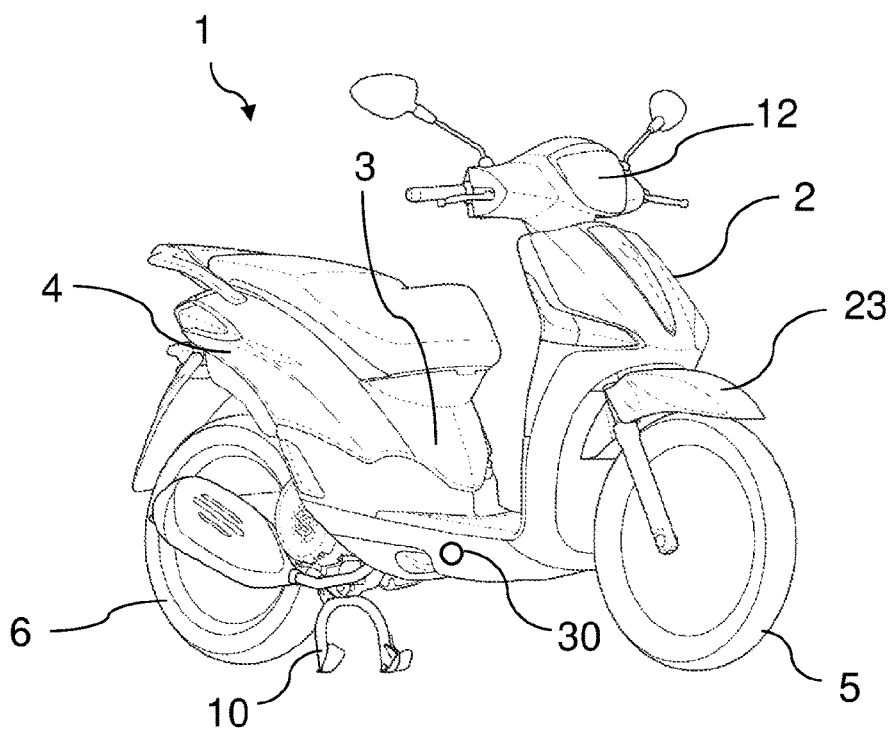
FIG. 1 shows a perspective view of one non-limiting embodiment of a motorcycle.
Figure 2:
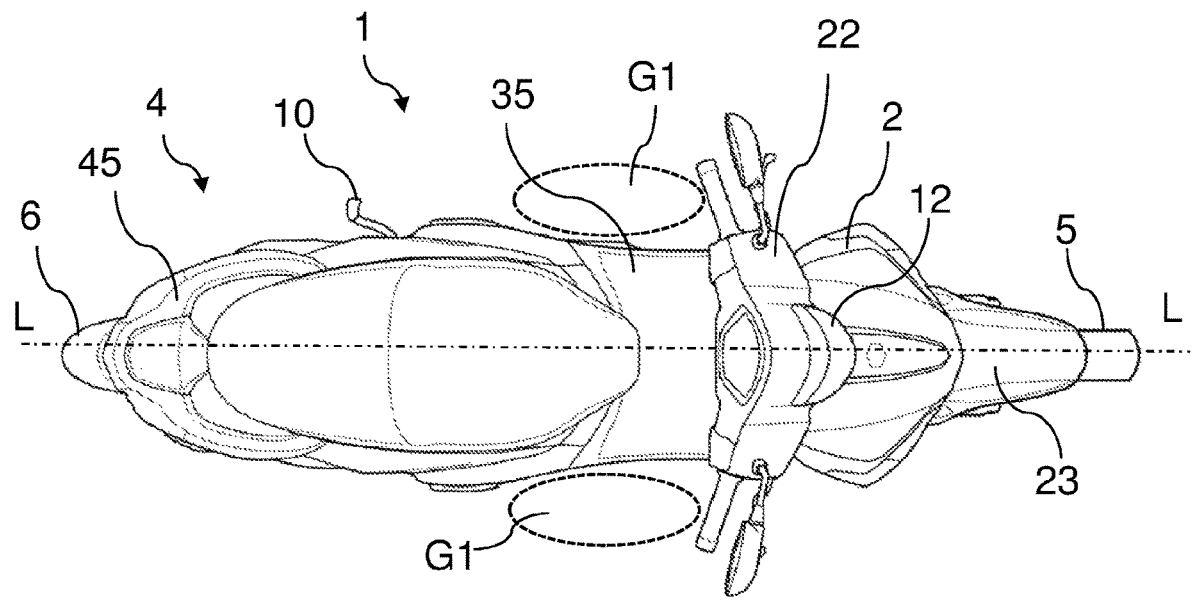
FIG. 2 shows a plan view of the motorcycle of FIG. 1.
Figure 3:
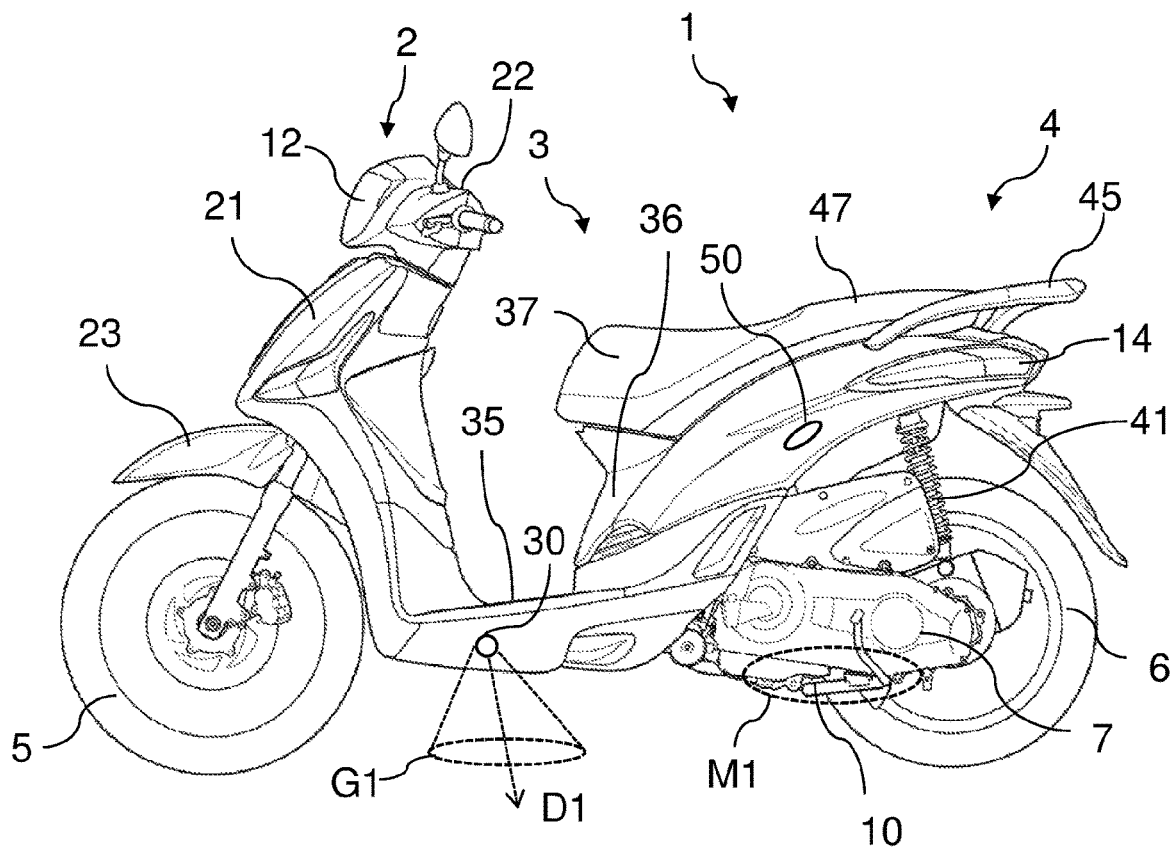
FIG. 3 shows a side view of the motorcycle of FIG. 1, wherein the motorcycle is in one first operative configuration.
Figure 4:
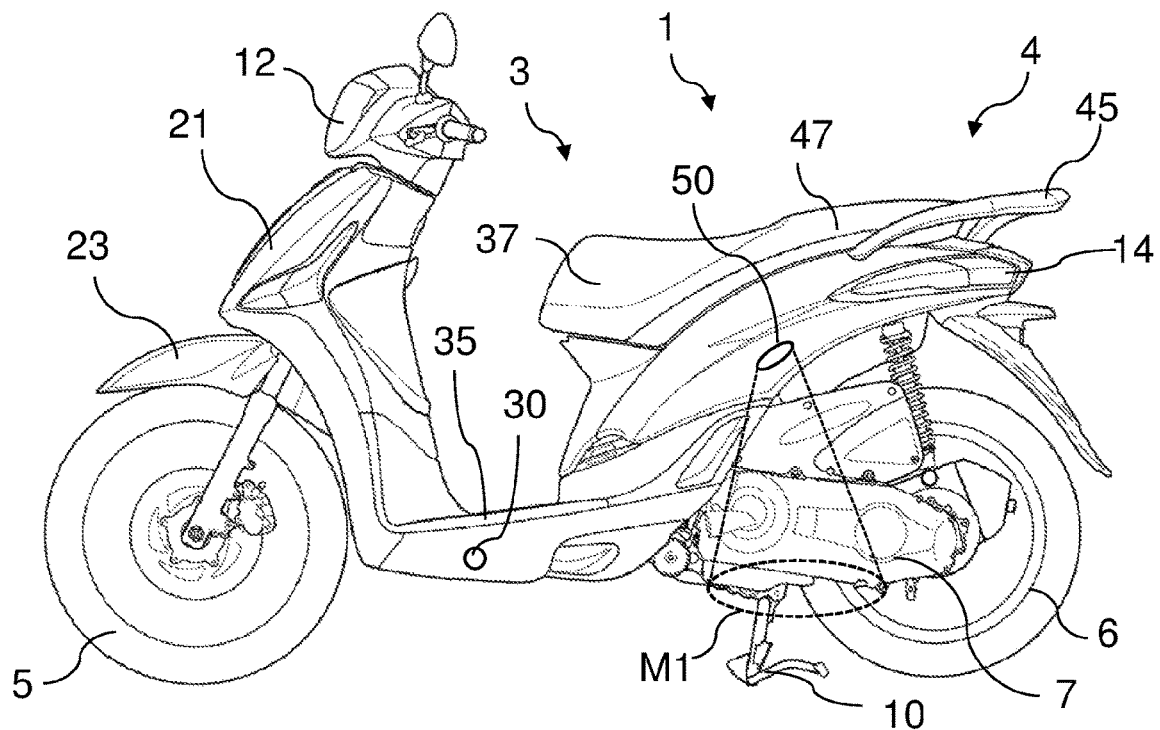
FIG. 4 shows a further side view of the motorcycle of FIG. 1, wherein the motorcycle is in one second operative configuration.

In the enclosed FIGS. 1 to 4 one embodiment of a motorcycle 1 is shown, that, in the specific represented example, is embodied, without limitation, by a two-wheel motorcycle and in particular by a two-wheel scooter, having a front wheel 5 and a rear wheel 6.

In the hereinafter description, reference will be made to a generic motorcycle 1, thereby meaning that the following description is applicable in general to any type of motorcycle 1 of category L including:

a motorcycle body 2,3,4;
at least two wheels 5, 6 constrained to the motorcycle body 2,3,4;
a traction engine 7, e.g. thermal or electric or hybrid, constrained to the motorcycle body 2,3,4 and operatively connected to at least one of the two wheels 5,6.

For example, the aforesaid two-wheel motorcycle 1, is a two-wheel motorcycle, as for example a scooter or a motorbyke, or a three-wheel motorcycle whereof at least two front wheels are steering and tilting, or a quadricycle provided with two pairs of tilting wheels and at least two steering wheels.

The motorcycle body 2,3,4 extends along a longitudinal axis L-L that is parallel to the driving axis of the motorcycle 1 and has a front part 2, a tail part 4 and a central part 3 included between the front part 2 and the tail part 4. The central part 3 represents the part of the motorcycle body 1 on which the body of the rider is arranged mounting the motorcycle 1 and/or riding the motorcycle 1 in a normal condition of use and drive of the motorcycle 1. In the example, the central part includes a platform 35, a support placed under the saddle 36, and a front portion 37 of the saddle. In the example, the front part 2 includes a front shield 21, a steering handlebar 22, the front wheel 5, a front mudguard 23. In the example, the rear part 4, includes a front portion 47 of the saddle, one storage container 45, one or two back suspensions 41, the back wheel 6, the traction engine 7.

The motorcycle 1 includes at least one front headlight 12 fixed to the front part 2 and at least one back light 14 fixed to the tail part 4 and directed to an opposite direction with respect to the headlight 12. When the steering handlebar 22 is not rotated, that is, when both the front wheel 5 and the back wheel 6 are aligned along the longitudinal axis L-L, the headlight 12 is such to emit an optical beam mainly centred along the longitudinal axis L-L and directed towards a ground portion arranged at the front with respect to the motorcycle 1. The rear light 14 is such that it emits an optical non directional radiation, usually concentrated at the same height of the same rear light thereof in order to avoid to dazzle the vehicles that follow the motorcycle 1.

According to one advantageous and non-limiting embodiment, the motorcycle 1 includes at least one kickstand 10 adapted to be moved in order to selectively assume a resting operating position and a working operating position, wherein, in the working operating position, the kickstand 10 has at least one end portion leaning against a ground portion being placed laterally and/or under the motorcycle body 1. The aforesaid kickstand 10 is for example rotatably hinged to a supporting frame of the motorcycle 1 or, as in the example indicated in FIGS. 1-4, it is hinged to the crankcase of the traction motor 7.

The motorcycle 1 also includes a first auxiliary lighting device 50 adapted to light the kickstand 10 or render it luminous, during the parking operations. It must be noted that in the FIGS. 1 and 4 the kickstand 10 is shown in the operative working position while in FIG. 3 it is shown in the resting operative position. The kickstand 10 is for example, indifferently, a side kickstand having one only arm leaning against the ground or a central kickstand with two arms leaning on the ground.

According to one preferred embodiment, the first auxiliary lighting device 50 is such as to light the kickstand 10 or render it luminous when the kickstand 10 is in the resting position. For example, it can be observed from the example of FIG. 4 that the first auxiliary lighting device 50 is such as to light a motorcycle 1 portion M1 and in particular one portion of the tail part 4 of the motorcycle 1 and more precisely one portion M1 of the traction motor 7. Though it is convenient that the first auxiliary lighting device 50 lights the kickstand 10 or renders it luminous when it is in the resting position, it is however possible to provide that the first auxiliary lighting device 50 is such as to light the kickstand 10 or render it luminous when it is in the working position.

Figure 5:
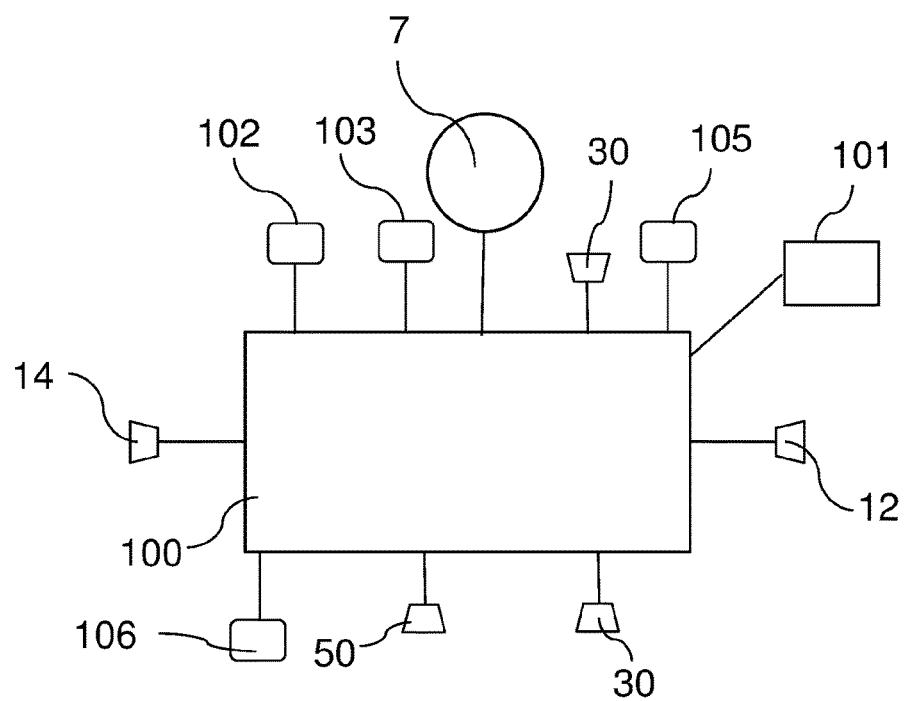
FIG. 5 shows a functional block diagram of one exemplary embodiment of one electronic control unit of the motorcycle of FIG. 1.

Referring to FIG. 5, according to one advantageous embodiment, the motorcycle 1 includes an electronic control unit 100 operatively connected to the first auxiliary lighting device 50 in order to activate and deactivate it.

For example, the electronic control unit 100, as well as the first auxiliary lighting device 50, is fed by one battery 101 of the motorcycle 1.

Always referring to FIG. 5, according to a non-limiting embodiment, the electronic control unit 100 is the ECU (Engine Control Unit) of the motorcycle 1 and it is such as to control the traction motor 7 too of the motorcycle 1.

According to one advantageous embodiment, the first auxiliary lighting device 50 is operatively connected to the electronic control unit 100 in order to be activated and deactivated by it, and the electronic control unit 100 is such to activate the first auxiliary lighting device 50 when the speed of the motorcycle 1 is equal to zero and/or when the traction engine 7 changes from an on-state to an off-state and/or when the driver getting off from the motorcycle 1 is detected.

According to one non-limiting embodiment, the first auxiliary lighting device 50 is integrated in the kickstand 10. For example, the kickstand 10 includes one seat that houses one optical source of the first auxiliary lighting device 50. One or more electric conductors pass in the kickstand 10 to electrically connect the optical source to the electronic control unit 100 of the motorcycle 1.

According to one embodiment alternative to the above described one, the first auxiliary lighting device is external to the kickstand, it is fastened to the body 2,3,4 of the motorcycle 1 and it is oriented towards the kickstand 10 when the kickstand 10 is in the resting position. This may be obtained using an optical source, fastened to the body 2,3,4 and preferably, to the central part 4. In particular, what above described shall be obtained in case the source is a direct optical source, as for example a LED, and/or using an optical system for example including at least one lens and or at least one spotlight able to spatially shape the optical radiation emitted by a non-direct optical source, as for example an incandescent light or a halogen light. Preferably, the aforesaid optical source cannot be seen looking at the motorcycle from an observation point behind the motorcycle along the longitudinal axis L-L when the motorcycle is running.

According to an advantageous embodiment, the motorcycle 1 also includes a twilight sensor 105 operatively connected to the electronic control unit 100. The electronic control unit 100 is programmed to keep the first auxiliary lighting device 50 off, regardless of the speed of the motorcycle 1 and/or regardless of the switching on or off of the traction motor 7, when detecting a certain degree of ambient lighting. Thereby, it is possible to avoid to activate the first auxiliary lighting device 50 when not required by circumstances.

According to one advantageous and non-limiting embodiment, the motorcycle 1 also includes a second auxiliary lighting device 30 fastened to the motorcycle body 2,3,4 and adapted to be electrically controlled to be activated and deactivated. The second auxiliary lighting device 30 is arranged and oriented so that, when activated, it is such as to light, preferably selectively, a ground portion G1, being on the side and/or under the central part 3 of the motorcycle body 2,3,4. For the purposes of the present invention, selectively means mainly or exclusively. Preferably, the second auxiliary lighting device 30 is arranged on the motorcycle body 1 and fixed in the middle, or substantially in the middle, between the front wheel 5 and the back wheel 6.

According to one advantageous embodiment, the second auxiliary lighting device 30 is arranged in the central part 3 of the body of the motorcycle 1 and it is oriented towards the ground. In one example consistent with the embodiment represented in FIGS. 1 to 4, the motorcycle 1 is a scooter and the central part 3 of the motorcycle body 2,3,4 includes a platform 35 and the second auxiliary lighting device 30 is placed beneath the platform 35, in particular below a step on wall of the platform 35.

Preferably, the second auxiliary lighting device 30 has a main emission optical axis D1 being oriented along a direction transversal to the longitudinal axis L-L and facing the ground. This can be obtained using a direct optical source, as for example a LED, and/or using an optical system for example including at least one lens and/or at least one spotlight able to spatially shape the optical radiation emitted by a non-direct optical source, as for example an incandescent light or a halogen light.

According to one advantageous and non-limiting embodiment, the second auxiliary lighting device 30 includes one pair of auxiliary lighting devices placed at opposite sides between them with respect to the longitudinal axis L-L.

According to one advantageous embodiment, the electronic control unit 100 is operatively connected to the second auxiliary lighting device 30 in order to activate and deactivate it. The electronic control unit 100 is such to automatically activate the second auxiliary lighting device 30 when the speed of the motorcycle 1 is lower than a threshold speed. Conveniently, the threshold speed has an absolute value higher than zero. For example, the threshold speed is equal to 10 km/h or equal to 5 km/h. According to one embodiment, referring to FIG. 5, the electronic control unit 100 is such to receive, for example from a speed sensor 102 provided on board the motorcycle 1 or connected operatively thereof, an electric signal bearing information related to the motorcycle 1 speed. The above described embodiment is particularly advantageous wherein the second auxiliary lighting device 30 is automatically activated when it detects that the motorcycle speed drops from any positive value below a certain threshold value, so that it activates automatically the second auxiliary lighting device 30 when it is likely that the driver is performing a stopping and/or a parking operation of the motorcycle 1.

Preferably, also the second auxiliary lighting device 30 is fed by the battery 101 of the motorcycle 1.

According to one further embodiment, the motorcycle 1 includes a radio interface 103 operatively connected to the electronic control unit 100. The electronic control unit 100 is programmed to activate the first 50 and/or the second 30 auxiliary lighting device when the speed of the motorcycle 1 is equal to zero and in particular when the motorcycle is in the parking state and when receiving a radio control signal from the radio interface 103. Thereby, it will be advantageously possible to use the first and/or the second auxiliary lighting device also to enable the authorized user of the motorcycle 1 to detect the parking position of the motorcycle 1 when it is dark and from a certain distance. The aforesaid radio interface 103 is for example an interface of a wireless portable device authorizing the use of the motorcycle 1, as for example an alarm controller and/or a keyfob.

On the basis of what above described it is thus possible to understand that the motorcycle 1 of the above described type enables to reach the aforementioned objects referring to the prior art state. In fact, due to the provision of the first lighting device 50 in the parking step also under low environmental lighting the motorcycle 1 driver can easily detect the kickstand 10, in order to drive it taking it from the resting position to the working position.

It is possible to provide that, after being activated, the first auxiliary lighting device 50 is automatically deactivated if an event occurs or if it is time-controlled, for example under the control of the electronic control unit 100.

According to one embodiment, the motorcycle 1 includes a detecting device 106 adapted to supply a signal bearing information related to the presence and/or absence of the driver on the motorcycle 1 (hereinafter called "driver presence sensor 106") operatively connected to the electronic control unit 100. It is possible to provide that, according to the signal provided by the driver presence sensor 106, the electronic control unit 100 is configured and programmed to establish the activation of the first auxiliary lighting device 50, for example in order to activate the first auxiliary lighting device 50 when the electronic control unit 100 detects that the driver has got off the motorcycle 1. The driver presence sensor 106 includes for example an electric switch for example placed under the saddle. One non-limiting example of driver presence sensor 106 is described in Patent EP2130713 B1, by the same Applicant.

Furthermore, if the second auxiliary lighting device 30 is also provided in the motorcycle 1, it is possible to provide that, according to the signal provided by the driver presence sensor 106, the electronic control unit 100 is configured and programmed to deactivate the second auxiliary lighting device 30, when it detects that the driver has got off the motorcycle 1 or after a time lapse from such detection, for example equal to, or almost equal to, 60 seconds.

Figure 6:
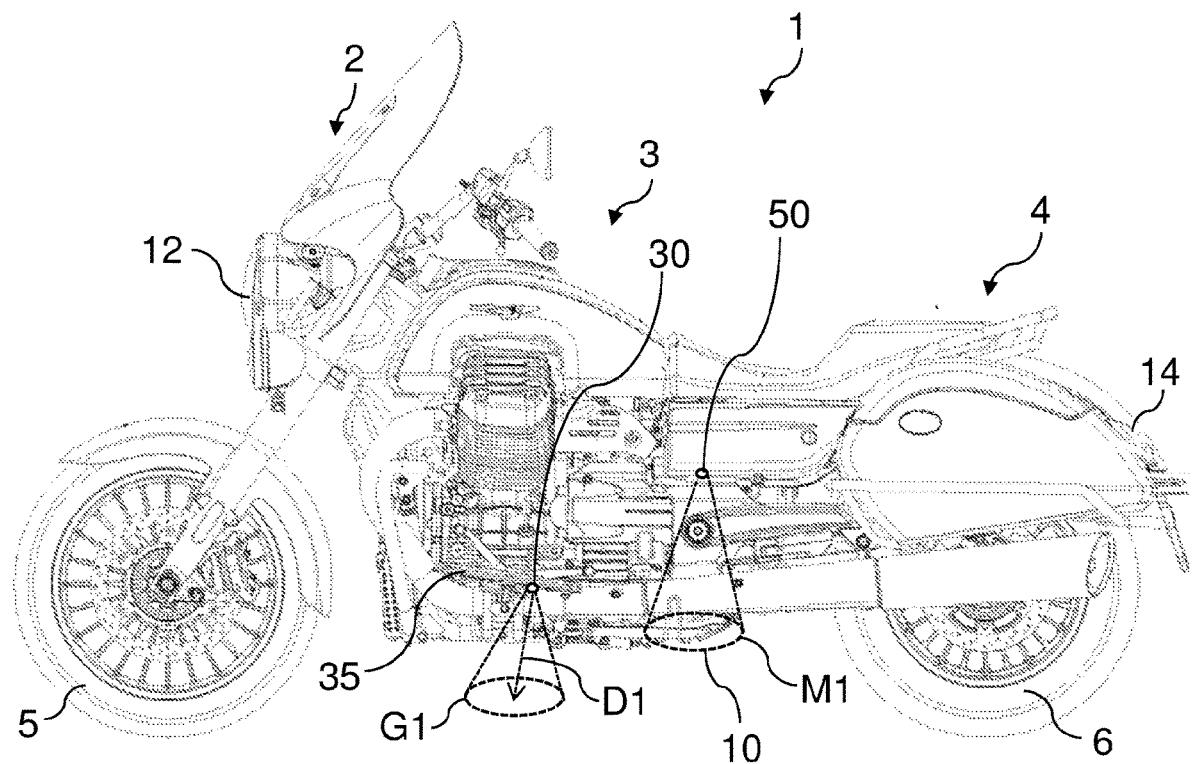
FIG. 6 shows a side view of one possible embodiment of a motorcycle alternative to the one of FIG. 1.

One alternative embodiment of the motorcycle of FIG. 1 is shown in FIG. 6. The motorcycle of FIG. 6 is a motorcycle and includes the first auxiliary lighting device 50 which is fixed to a side of the central part of the motorcycle 1. As illustrated in FIG. 6, optionally, in this motorcycle 1 too it is possible to provide the second auxiliary lighting device 30, or two second lighting devices 30 placed on opposite sides with respect to the longitudinal axis (L-L). In the example of FIG. 6 the second auxiliary device 30 is fixed to the platform 35, in particular it is fixed below a step on wall of the platform 35.

Subject to the principle of the invention, the embodiments and the implementation details shall be widely varied with respect to what has been described and illustrated for exemplary purposes, without departing from the scope of the invention as defined in the enclosed claims.

The invention claimed is:

1. A motorcycle comprising:
 a motorcycle body extending along a longitudinal axis and having a front part, a tail part and a central part comprised between the front part and the tail part;
 at least two wheels constrained to the motorcycle body, including a front wheel and a rear wheel;
 a traction engine constrained to the motorcycle body and operatively connected to at least one of the wheels;
 at least one headlight fixed to the front part and at least one rear light fixed to the tail part;
 at least one kickstand adapted to be moved in order to selectively assume a resting operating position and a working operating position, wherein, in the working operating position, the kickstand has at least one end portion leaning against a ground portion being placed laterally and/or under the motorcycle body; and
 further including a first auxiliary lighting device adapted to light the kickstand or render it luminous, wherein the first auxiliary lighting device is oriented in order to light the kickstand when the kickstand is in the resting position.

2. The motorcycle according to claim 1, wherein the first auxiliary lighting device is integrated in the kickstand.

3. The motorcycle according to claim 1, wherein the first auxiliary lighting device is external to the kickstand, it is fastened to the body of the motorcycle and it is oriented towards the kickstand when the kickstand is in the resting position.

4. The motorcycle according to claim 1, wherein the motorcycle includes an electronic control unit operatively connected to the first auxiliary lighting device in order to activate and deactivate it and wherein the electronic control unit is such to activate the first auxiliary lighting device when the speed of the motorcycle is equal to zero and/or the traction engine changes from an on state to an off state and/or when the driver getting off from the motorcycle is detected.

5. The motorcycle according to claim 4, further including a twilight sensor operatively connected to the electronic control unit and wherein the electronic control unit is programmed to keep the first auxiliary lighting device off when detecting a certain degree of ambient lighting.

6. The motorcycle according to claim 4, further including a radio interface operatively connected to the electronic control unit and wherein the electronic control unit is programmed to activate a second auxiliary lighting device when the speed of the motorcycle is equal to zero and when receiving a radio control signal from said radio interface.

7. The motorcycle according to claim 4, further including a detecting device adapted to provide an electrical signal carrying an information related to the presence and/or absence of the driver on the motorcycle, being operatively connected to the electronic control unit and wherein, based on the electrical signal provided by the detecting device, the electronic control unit is configured and programmed to activate the first auxiliary lighting device when the electronic control unit detects that the driver got off the motorcycle.

8. The motorcycle according to claim 4, further comprising a second auxiliary lighting device fixed to the motorcycle body and operatively connected to the electronic control unit in order to be thereby activated and deactivated, wherein the second auxiliary lighting device is arranged and oriented so that, when activated, it lights a ground portion being on the side and/or under the central part of the motorcycle body.

9. The motorcycle according to claim 8, wherein the electronic control unit is such to automatically activate the second lighting device when the speed of the motorcycle is lower than a threshold speed.

10. The motorcycle according to claim 9, wherein the absolute value of the threshold speed is greater than zero.

11. The motorcycle according to claim 10, wherein said threshold speed is greater than or equal to 5 km/h.

12. The motorcycle according to claim 8, wherein the second auxiliary lighting device is arranged in the central part and it is oriented towards the ground.

13. The motorcycle according to claim 8, wherein the second auxiliary lighting device has a main emission optical axis being oriented in a direction transversal to the longitudinal axis and facing the ground.

14. The motorcycle according to claim 8, wherein the motorcycle wherein said central part includes a platform and wherein the second auxiliary lighting device is placed under the platform.

* * * * *